(12) United States Patent
Kikuchi et al.

(10) Patent No.: US 6,203,886 B1
(45) Date of Patent: Mar. 20, 2001

(54) SKEW-TOOTHED BELT AND METHOD FOR MANUFACTURING THE SAME

(75) Inventors: Hiroshi Kikuchi; Tooru Fujiwara; Mitsuo Kasahara; Yoshinori Itou, all of Saitama-ken (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 09/271,649

(22) Filed: Mar. 18, 1999

(30) Foreign Application Priority Data

Mar. 23, 1998 (JP) .................................................. 10-074393

(51) Int. Cl.$^7$ ...................................................... B23B 3/28
(52) U.S. Cl. ............................ 428/169; 428/163; 428/168
(58) Field of Search .................................... 428/163, 168, 428/169

(56) References Cited

FOREIGN PATENT DOCUMENTS

| 0309653 | 4/1989 | (EP) . |
| 0571887 | 12/1993 | (EP) . |
| 2665737 | 2/1992 | (FR) . |
| 2686959 | 8/1993 | (FR) . |
| 10184808 | 7/1998 | (JP) . |

*Primary Examiner*—Terrel Morris
*Assistant Examiner*—Christopher C. Pratt
(74) *Attorney, Agent, or Firm*—Dann, Dorfman, Herrell and Skillman; Henry H. Skillman

(57) ABSTRACT

A skew-toothed belt includes tension members, a tooth portion, and a back portion. The tooth portion and the back portion are located on opposite sides of an array of the tension members. The tooth portion is covered with a tooth cloth, which is arranged such that the weft thread extends substantially perpendicular to the tooth trace direction of each skewed tooth. A method for manufacturing the skew-toothed belt includes the steps of: cutting an elongated tooth cloth material obliquely to the weft direction so as to obtain a tooth cloth sheet; bonding the opposite end portions of the tooth cloth sheet extending along the warp together to form a cylindrical tooth cloth; fitting the cylindrical tooth cloth onto a cylindrical die on which tooth-profiled grooves are formed; sequentially winding the tension members and an unvulcanized rubber compound sheet onto the fitted cylindrical tooth cloth; subjecting the resultant assembly to forming and vulcanization in a pressure chamber; and cutting the resultant cylindrical body into annular toothed belts, each having a predetermined width.

12 Claims, 3 Drawing Sheets

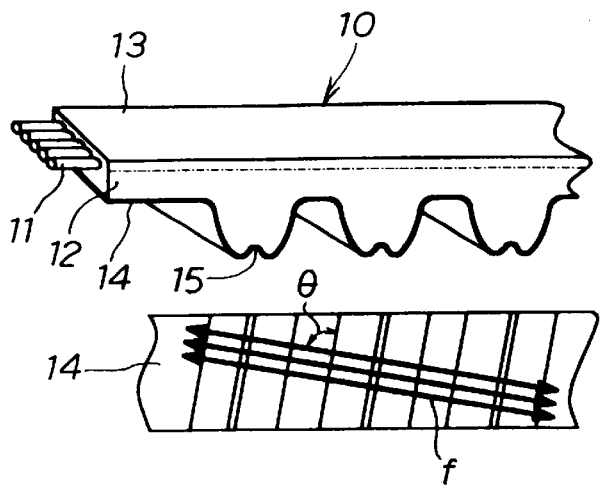
FIG.1A
FIG.1B
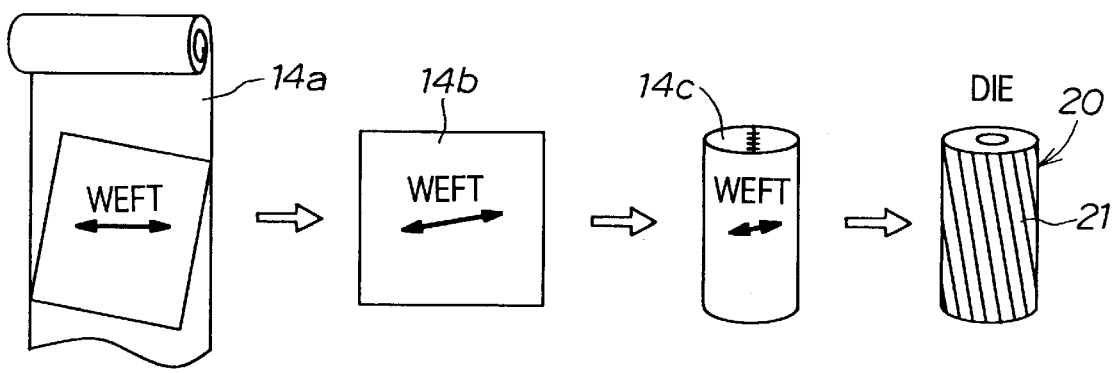
FIG.2
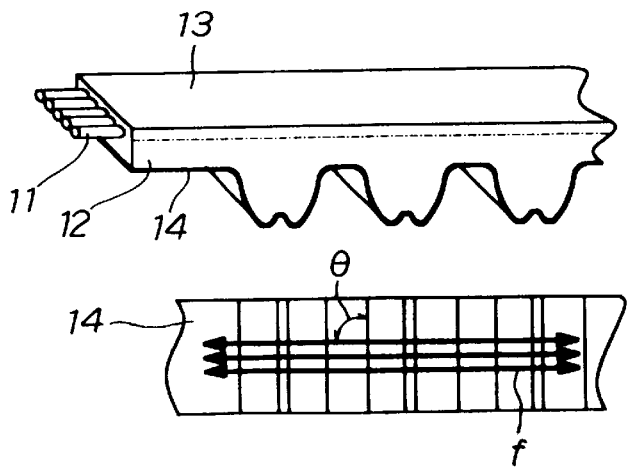
FIG.3A (PRIOR ART)
FIG.3B (PRIOR ART)

SKEW-TOOTHED BELT AND METHOD FOR MANUFACTURING THE SAME

BACKGROUND OF THE INVENTION

1. Field of the Invention

The present invention relates to a toothed belt, and more particularly to a skew-toothed belt for power transmission and to a method for manufacturing the skew-toothed belt.

2. Description of the Related Art

FIGS. 3A and 3B are a perspective view showing the appearance of a conventional toothed belt, and a bottom view showing the arrangement of the weft f as viewed from the teeth side. The toothed belt includes core yarns, or tension members 11, a tooth portion 12, and a back portion 13. The tooth portion 12 and the back portion 13 are located on opposite sides of an array of the tension members 11 and are formed of tooth rubber and back rubber, respectively. The side of the toothed belt on which teeth are formed is called the tooth side. The tooth side is covered with a tooth cloth 14. The warp and the weft f, which are multifilament yarns of polyamide or a like material, are woven into the tooth cloth 14. The tooth cloth 14 is usually arranged such that the warp extends in the width direction of the belt and such that the weft f extends in the longitudinal direction of the belt.

FIG. 4 shows a portion of a process for manufacturing such a toothed belt. As shown in FIG. 4, in a cutting step for cutting out the tooth cloth 14, an elongated tooth cloth material 14a impregnated with rubber dough is cut in the width direction thereof, i.e., along the weft arrangement, thereby obtaining a tooth cloth sheet 14b. The opposite end portions of the tooth cloth sheet 14b extending along the warp are bonded together to form a cylindrical tooth cloth 14c. The cylindrical tooth cloth 14c is fitted onto a cylindrical die 20', on the circumference of which are formed axially-extending tooth-profiled grooves 21'. Then, the adhesive-applied tension members (not shown but see the one 11 shown in FIG. 3A) are wound onto the cylindrical tooth cloth 14c. Further, an unvulcanized rubber compound sheet, which will become tooth rubber and back rubber, is wound onto the wound tension members. The resultant assembly is subjected to forming and vulcanization in a pressure chamber. Subsequently, the resultant cylindrical body is cut into annular toothed belts, each having a predetermined width.

In the thus-obtained annular toothed belt, as shown in FIG. 3B, the weft f extends in the longitudinal direction of the belt. Thus, the warp interlaced with the weft f extends in the width direction of the belt. Accordingly, the stretchability of the weft f itself helps the tooth cloth 14 follow the tooth profile intimately.

Thus, in the case of a toothed belt whose tooth trace direction is perpendicular to the longitudinal direction of the belt, i.e., whose teeth are not skewed, the tooth cloth 14 follows the tooth profile intimately, so that the teeth are profiled to a high degree of accuracy, thereby establishing good engagement with a pulley.

However, in FIG. 6, in order to manufacture a toothed belt whose tooth trace direction is oblique to the longitudinal direction thereof, i.e., a skew-toothed belt, the method for cutting the tooth cloth 14b as shown in FIG. 4 is combined with a cylindrical die 20 on the circumference of which are formed tooth-profiled grooves 21 extending obliquely to the axis thereof. In such a case, the weft f extends in the longitudinal direction of the belt, but obliquely to the tooth trace direction, as shown in FIG. 5B. As a result, the stretchability of the weft f becomes insufficient during forming and vulcanization in a pressure chamber, and thus the tooth cloth follows the tooth profile poorly.

Therefore, the skewed teeth fail to be profiled as desired, resulting in a potential failure to smoothly engage a pulley and thus raising various problems in terms of ability to reduce the size of a skew-toothed belt, power transmission rate, durability, applications, and reliability.

SUMMARY OF THE INVENTION

An object of the present invention is to provide a skew-toothed belt whose teeth are profiled to a high degree of accuracy and establish smooth engagement, as well as a method for manufacturing the skew-toothed belt capable of profiling teeth to a high degree of accuracy.

To achieve the above object, the present invention provides a skew-toothed belt comprising a tooth cloth attached to skewed teeth. The tooth cloth is woven of warp thread and a weft thread. The weft thread of the tooth cloth extends substantially perpendicular to the tooth trace direction of each skewed tooth.

Through employment of such arrangement of the weft, the skewed teeth are uniformly profiled to a high degree of accuracy. Also, a force to be transmitted is imposed on the skewed tooth without generation of a shear force on the surface of the tooth cloth, and the force is uniformly transmitted along the tooth trace direction. Thus, smooth engagement is established between the skewed teeth and a pulley without transmission loss.

The present invention further provides a method for manufacturing a skew-toothed belt, comprising the steps of: sequentially winding a tooth cloth sheet woven of warp threads and a weft thread, a tension member, and an unvulcanized rubber compound sheet onto a die on the circumference of which are formed tooth-profiled grooves extending obliquely to the axis of the die; subjecting the resultant assembly to forming and vulcanization in a pressure chamber; and cutting the resultant article into an annular form. The weft thread of the tooth cloth sheet and the tooth groves intersect substantially perpendicular to each other.

Through employment of the above relationship between the orientation of the weft and that of the tooth-profiled grooves, during forming and vulcanization in the pressure chamber, the weft stretches intimately along the profile of the tooth-profiled groove, thereby profiling the outer surface of the skewed tooth as desired. Since the warp threads extend substantially parallel to the tooth trace direction of each skewed tooth, the skewed teeth are formed uniformly in terms of tooth profile along the tooth trace direction. Thus, the skewed teeth can be profiled to a high degree of accuracy.

Even in the case of a skew-toothed belt in which a dimple is formed on the crest of each skewed tooth in order to absorb collision energy generated in association with engagement between the skewed teeth and a pulley, the weft follows the profile of the dimple intimately, so that the dimpled skewed teeth can also be profiled to a high degree of accuracy.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 1A is a perspective view of a skew-toothed belt according to an embodiment of the present invention;

FIG. 1B is a bottom view of the belt;

FIG. 2 is a view illustrating a cutting step in manufacture of the skew-toothed belt of FIGS. 1A and 1B;

FIG. 3A is a perspective view of a conventional toothed belt;

FIG. 3B is a bottom view of the conventional toothed belt;

DESCRIPTION OF THE PREFERRED EMBODIMENT

Figure 4:
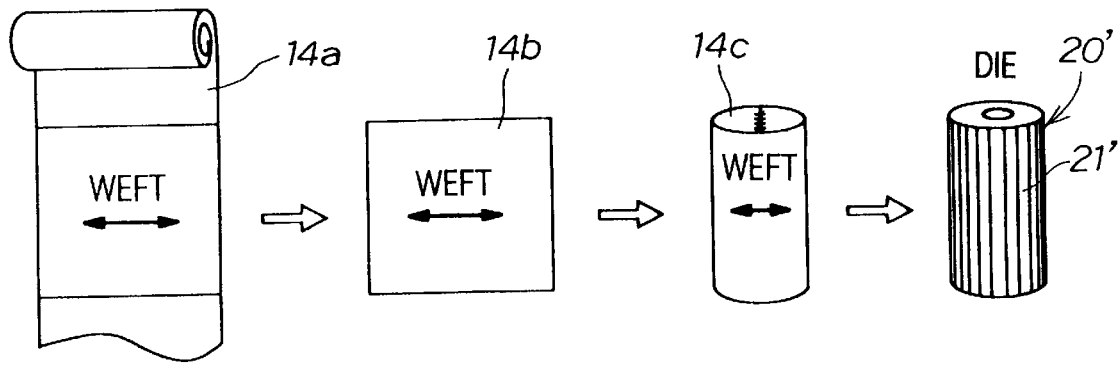
FIG. 4 is a view illustrating a cutting step in manufacture of the conventional toothed belt of FIGS. 3A and 3B.
Figure 5A:
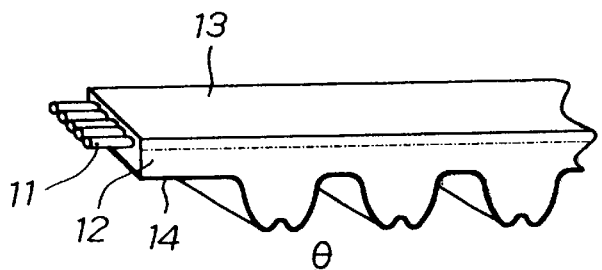
FIG. 5A is a perspective view of a conventional skew-toothed belt.
Figure 5B:
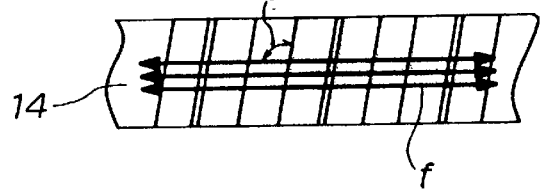
FIG. 5B is a bottom view of the conventional skew-toothed belt.
Figure 6:
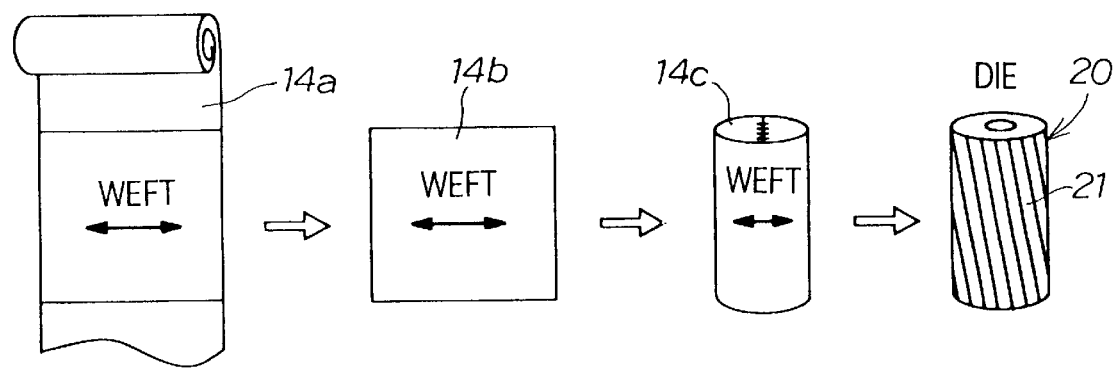
FIG. 6 is a view illustrating a cutting step in manufacture of the conventional skew-toothed belt of FIGS. 5A and 5B.

An embodiment of the present invention will now be described in detail with reference to the drawings.

FIGS. 1A and 1B show a skew-toothed belt according to an embodiment of the present invention. FIG. 2 shows an embodiment of a cutting step in manufacture of the skew-toothed belt shown in FIGS. 1A and 1B.

As shown in FIG. 1A, a skew-toothed belt 10 according to the present embodiment includes core yarns, or tension members 11, a tooth portion 12, and a back portion 13. The tooth portion 12 and the back portion 13 are located on opposite sides of an array of the tension members 11.

The tension member 11 usually assumes the form of a yarn composed of glass fibers, aramid fibers, or metallic fibers. Before being embedded in a toothed belt, the tension members 11 are impregnated with a solution of adhesive.

The tooth portion 12 is composed of tooth rubber, and the back portion 13 is composed of back rubber. The side of the skew-toothed belt on which teeth are formed is called the tooth side. The tooth side is covered with a tooth cloth 14 woven of warp threads and a weft thread f. Multifilament yarns of polyamide fibers, polyaramid fibers, or polyester fibers are used as the warp threads and the weft thread f and are plain-woven or twilled into the woven tooth cloth 14. In order to make the weft thread f stretchable sufficiently along the tooth profile, the weft thread f is crimped into a wooly form.

The tooth cloth 14 is usually impregnated with rubber dough before being bonded onto the surface of the tooth rubber, and is arranged such that the weft thread f extends substantially perpendicular to the tooth trace direction of each skewed tooth.

The angle θ between the weft thread f and the tooth trace direction of each skewed tooth is such that the weft thread f stretches along the tooth profile, i.e., such that the weft thread f and the tooth trace direction intersect substantially perpendicular to each other, specifically, at an angle of 70 to 110.

In order to absorb collision energy generated in association with engagement between the skewed teeth and a pulley, a dimple 15 is formed on the crest of each skewed tooth.

FIG. 2 shows a cutting step in manufacture of the skew-toothed belt 10. An elongated tooth cloth material 14a (woven of warp threads and a weft thread) impregnated with rubber dough is cut oblique to the weft direction so as to obtain the tooth cloth sheet 14b whose weft thread f forms an angle θ of the above-mentioned range.

The opposite end portions of the tooth cloth sheet 14b extending along the warp threads are bonded together to form a cylindrical tooth cloth 14c. The cylindrical tooth cloth 14c is fitted onto a cylindrical die 20. As a result, the weft thread f and the tooth trace direction of each skewed tooth intersect substantially perpendicular to each other, i.e., the weft thread f of the cylindrical tooth cloth 14c and tooth-profiled grooves 21 formed on the cylindrical die 20 intersect substantially perpendicular to each other. Notably, the planar tooth cloth sheet 14b may be directly wound onto the cylindrical die 20. In this case, the tooth cloth sheet 14b must be positioned at an appropriate degree of accuracy with respect to the tooth-profiled grooves 21, and thus this winding operation is time consuming.

Next, the adhesive-applied tension members 11 are wound onto the cylindrical tooth cloth 14c. Further, an unvulcanized rubber compound sheet, which will become tooth rubber and back rubber, is wound onto the wound tension members 11. The resultant assembly is subjected to forming and vulcanization in a pressure chamber. Subsequently, the resultant cylindrical body is cut into an endless toothed belts of closed loop form, each having a predetermined width.

Figure 7:
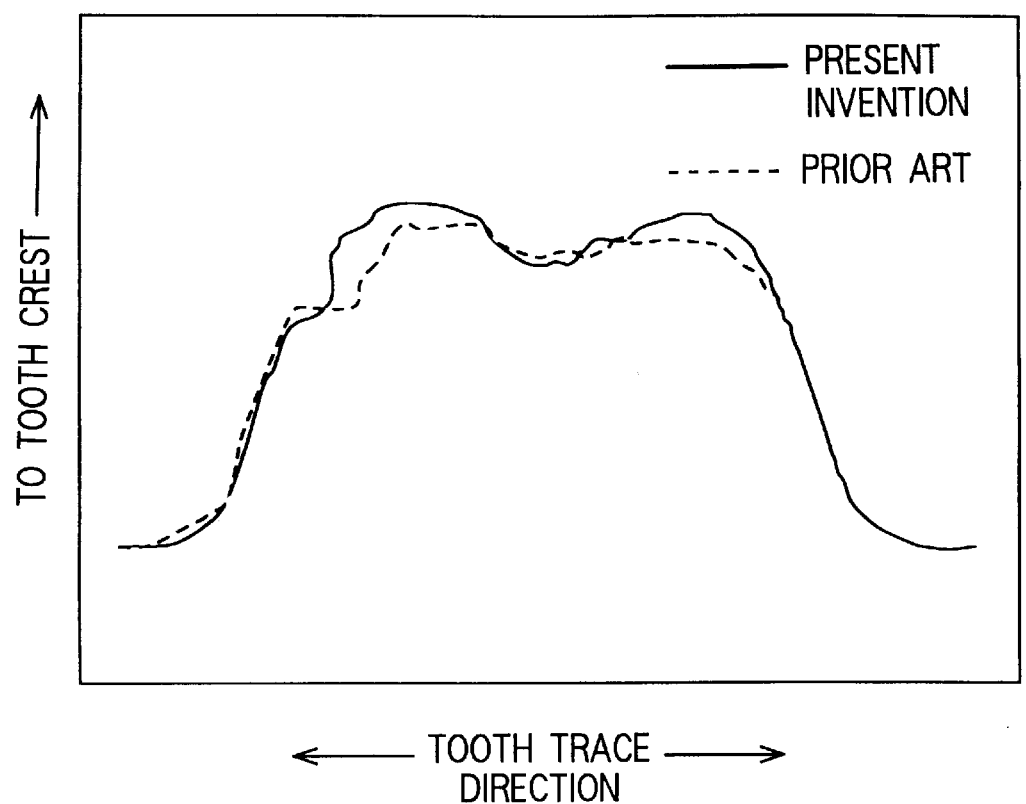
FIG. 7 is a diagram comparing tooth profiles between the present invention and the prior art.

In the thus-manufactured skew-toothed belt, particularly that having the dimple 15 formed on the crest of each skewed tooth, the weft thread f exhibits the stretchability thereof sufficiently, since the weft thread f of the tooth cloth 14 is directed substantially perpendicular to the tooth trace direction of each skewed tooth. The weft thread f follows the profile of the dimple 15 intimately, so that the dimpled skewed teeth are profiled to a higher degree of accuracy as compared to a conventional skew-toothed belt. This is specifically seen from FIG. 7, which compares tooth profiles between the present invention and the prior art.

Obviously, numerous modifications and variations of the present invention are possible in light of the above teachings. It is therefore to be understood that within the scope of the appended claims, the present invention may be practiced otherwise than as specifically described herein.

What is claimed is:

1. A skew-toothed belt comprising:
 a belt body having skewed teeth; and
 a tooth cloth attached to said belt body to cover the skewed teeth, wherein a weft thread of said tooth cloth extends substantially perpendicular to the tooth trace direction of each skewed tooth.

2. A skew-toothed belt according to claim 1, wherein the weft thread and the tooth trace direction intersect at an angle within the range of 70 to 100 degrees.

3. A skew-toothed belt according to claim 2, wherein the weft thread and the tooth trace direction intersect at 90 degrees.

4. A skew-toothed belt according to claim 1, wherein each of the skewed teeth has a dimple.

5. A skew-toothed belt according to claim 2, wherein each of the skewed teeth has a dimple.

6. A skew-toothed belt according to claim 3, wherein each of the skewed teeth has a dimple.

7. A method for manufacturing a skew-toothed belt having skewed teeth, comprising the steps of:

sequentially winding a tooth cloth sheet, a tension member, and an unvulcanized rubber compound sheet onto a die on the circumference of which are formed tooth-profiled grooves extending obliquely to the axis of the die;

subjecting a resultant assembly to forming and vulcanization in a pressure chamber; and cutting a resultant article into an annular form, wherein a weft thread of the tooth cloth sheet and the tooth-profiled grooves intersect substantially perpendicular to each other.

8. A method for manufacturing a skew-toothed belt according to claim 7, wherein the weft thread and the tooth trace direction intersect at an angle within the range of 70 to 100 degrees.

9. A method for manufacturing a skew-toothed belt according to claim 8, wherein the weft thread and the tooth trace direction intersect at 90 degrees.

10. A method for manufacturing a skew-toothed belt according to claim 7, wherein each of the skewed teeth has a dimple.

11. A method for manufacturing a skew-toothed belt according to claim 8, wherein each of the skewed teeth has a dimple.

12. A method for manufacturing a skew-toothed belt according to claim 9, wherein each of the skewed teeth has a dimple.

* * * * *